US007493639B2

(12) United States Patent
Lawler et al.

(10) Patent No.: US 7,493,639 B2
(45) Date of Patent: *Feb. 17, 2009

(54) INTERACTIVE PROGRAM SUMMARY PANEL

(75) Inventors: Frank A. Lawler, Seattle, WA (US); Joseph H. Matthews, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/081,268

(22) Filed: Mar. 15, 2005

(65) Prior Publication Data

US 2005/0160452 A1   Jul. 21, 2005

Related U.S. Application Data

(63) Continuation of application No. 09/228,005, filed on Jan. 8, 1999, now Pat. No. 6,868,551, which is a continuation of application No. 08/969,979, filed on Nov. 13, 1997, now Pat. No. 5,907,323, which is a continuation of application No. 08/435,117, filed on May 5, 1995, now abandoned.

(51) Int. Cl.
 H04N 5/445 (2006.01)
 G06F 13/00 (2006.01)

(52) U.S. Cl. ............... 725/40; 725/39; 725/41; 725/42; 725/43

(58) Field of Classification Search ............. 725/39–44
 See application file for complete search history.

(56) References Cited

U.S. PATENT DOCUMENTS 4,991,012 A   2/1991  Yoshino
5,001,554 A * 3/1991  Johnson et al. ............... 725/8
5,027,400 A   6/1991  Baji et al.
5,038,211 A   8/1991  Hallenbeck
5,161,019 A   11/1992 Emanuel
5,353,121 A   10/1994 Young et al.
5,412,720 A   5/1995  Hoarty
5,434,625 A   7/1995  Willis
5,485,221 A   1/1996  Banker et al.
5,523,796 A   6/1996  Marshall et al.
5,528,304 A   6/1996  Cherrick et al.
5,559,550 A   9/1996  Mankovitz
5,583,560 A * 12/1996 Florin et al. ............... 725/40
5,585,838 A * 12/1996 Lawler et al. ............... 725/54
5,619,249 A   4/1997  Billock et al.
5,629,733 A * 5/1997  Youman et al. ............. 725/53
5,635,978 A * 6/1997  Alten et al. ............... 725/42
5,654,748 A * 8/1997  Matthews, III ............. 725/14

(Continued)

OTHER PUBLICATIONS

Source et al., "Designing a Broadband Residential Entertainment Service: A Case Study," (Sep. 10, 1990).

*Primary Examiner*—Son P Huynh
(74) *Attorney, Agent, or Firm*—Klarquist Sparkman, LLP

(57) ABSTRACT

The present invention includes a method of displaying for a viewer summary information relating to programming available on an interactive television or televideo system. In a preferred embodiment, the method includes obtaining a user selection indication corresponding to a scheduled program selected by the viewer from a programming guide. Based on the user selection indication, the interactive television system accesses summary information relating specifically to the program selected by the viewer. The summary information preferably includes a text description of the programming and display imagery relating to the programming. The display imagery may include a multi-frame video sequence of or relating to the programming or a still video image.

17 Claims, 5 Drawing Sheets

U.S. PATENT DOCUMENTS

| | | | |
|---|---|---|---|
| 5,659,350 A * | 8/1997 | Hendricks et al. | 725/116 |
| 5,731,844 A | 3/1998 | Rauch et al. | |
| 5,798,785 A * | 8/1998 | Hendricks et al. | 725/46 |
| 5,805,763 A * | 9/1998 | Lawler et al. | 386/83 |
| 5,812,123 A | 9/1998 | Rowe et al. | |
| 5,907,323 A | 5/1999 | Lawler et al. | |
| 6,008,803 A | 12/1999 | Rowe et al. | |
| 6,163,345 A | 12/2000 | Noguchi et al. | |
| 6,181,335 B1 | 1/2001 | Hendricks et al. | |
| 6,239,794 B1 | 5/2001 | Yuen et al. | |
| 6,314,575 B1 | 11/2001 | Billock et al. | |
| 6,418,556 B1 | 7/2002 | Bennington et al. | |
| 6,419,137 B1 | 7/2002 | Marshall et al. | |
| 6,868,551 B1 * | 3/2005 | Lawler et al. | 725/40 |

* cited by examiner

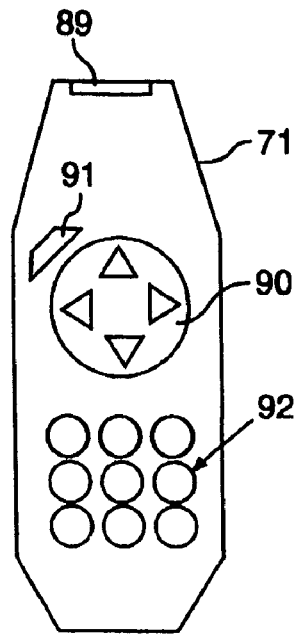
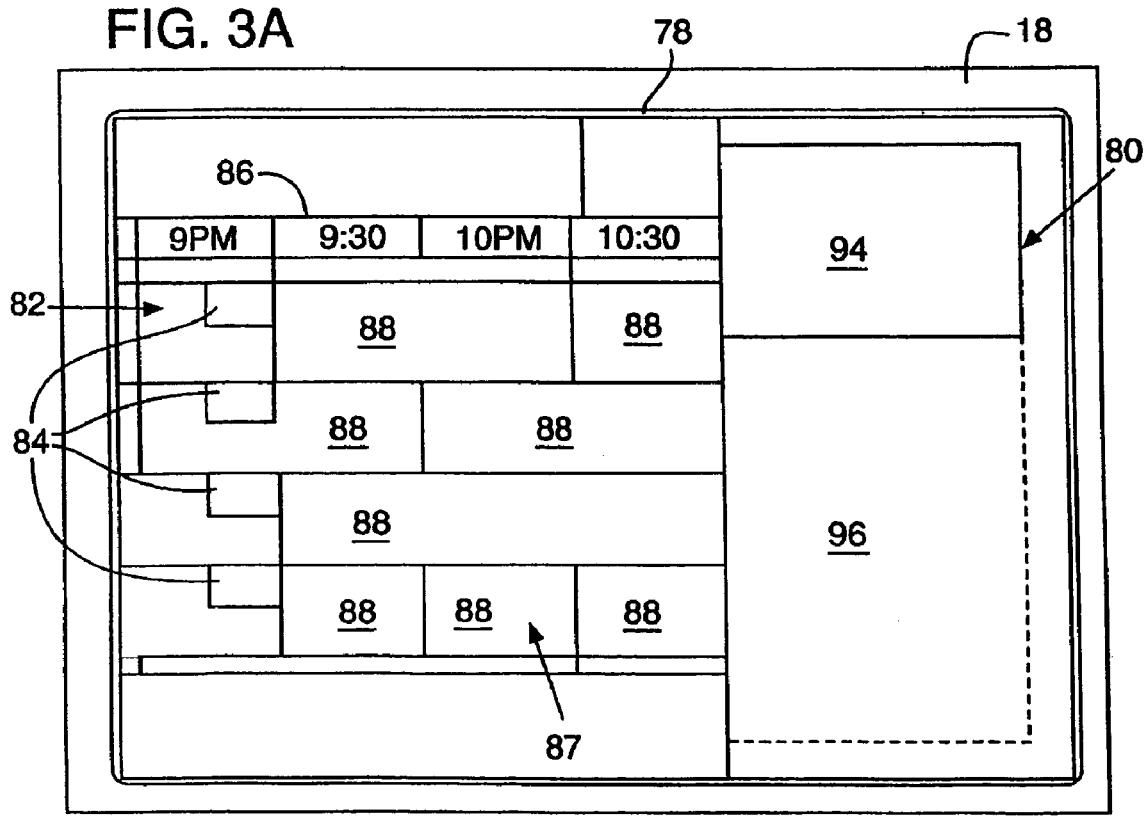

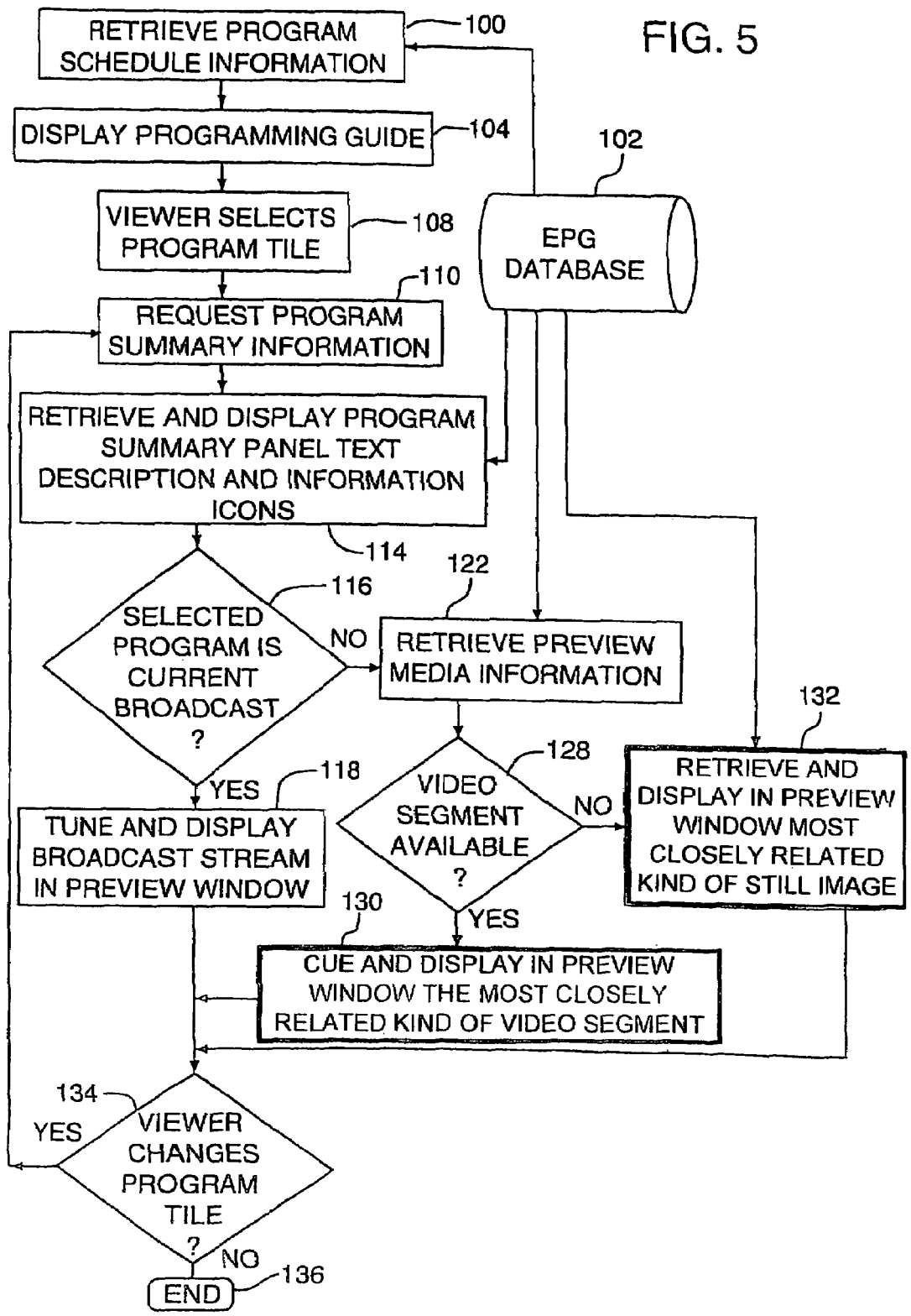

INTERACTIVE PROGRAM SUMMARY PANEL

CROSS-REFERENCE TO RELATED APPLICATIONS

This application is a continuation of U.S. patent application Ser. No. 09/228,005, now U.S. Pat. No. 6,868,551, which is a continuation of application Ser. No. 08/969,979, filed Nov. 13, 1997, now U.S. Pat. Ser. No. 5,907,323, which was a continuation of application Ser. No. 08/435,117, filed May 5, 1995, now abandoned.

FIELD OF THE INVENTION

The present invention relates to interactive television or televideo systems and, in particular, to a method of providing viewers with information about programming available on such systems.

BACKGROUND OF THE INVENTION

Conventional cable and satellite television transmission is evolving into interactive television or televideo (IT) systems. IT systems combine the video broadcast capability characteristic of conventional broadcast television with computer-executed applications or programming responsive to input from viewers. By some estimates, IT systems under development could include the equivalent of 500 channels of programming, including video broadcasting and applications.

Meaningful access to large amounts of interactive television programming will require that viewers be able to obtain and comprehend vast amounts of programming and scheduling information. Conventional printed programming guides, such as T.V. Guide magazine or local newspapers, already provide only incomplete programming information for cable television networks with as few as 50 channels. It is expected that complete printed programming guides for the large amounts of programming in IT systems would be very large and expensive and unacceptably cumbersome.

Some conventional cable television networks dedicate a channel to a programming guide service, such as the Prevue Channel, Prevue Express, and Prevue Express Plus services provided by Prevue Networks, Inc. This conventional type of programming service lists the titles of programs scheduled for selected times. Typically, the titles of programs scheduled for about four television channels over a period of about two hours are listed simultaneously.

The service automatically scrolls through all or most of the channels available on the cable television network and automatically shifts the two-hour scheduling period shown according to the actual time. The same program schedule is delivered to all viewers on the cable television network. Viewers passively view the program schedule as it is scrolled.

In some systems, only about 60% of a viewer's television screen is used to show the program schedule. The remaining screen portion is used as an advertising window dedicated to broadcasting selected advertising or service identifications. One service that is frequently advertised in the advertising window of a programming guide is pay-per-view (PPV) television. Advertisements for PPV services often include video clips or segments relating to programs (e.g., motion pictures) available from the service.

The video content of the advertising window is the same for all viewers and is independent of the program schedule information that is shown simultaneously. The video content of the advertising window and the program schedule may even be generated from independent media or sources and mixed for broadcast on the dedicated programming guide channel.

At least one available system provides viewers with limited supplemental text descriptions regarding programming listed on a television program schedule. The system requires the viewer to have special decoder equipment to intercept and decode television program schedule information that is transmitted automatically during the vertical blanking interval of a conventional television signal.

Only a limited amount of television program schedule information may be encoded and broadcast during each vertical blanking interval. Many automatic transmissions of this type are required to deliver all the program schedule information and supplemental text descriptions to the decoder equipment, where the decoded information is stored. The program schedule information and supplemental text descriptions can be displayed and viewed on demand after being loaded into the decoder equipment.

Transmitting the program information only automatically during the vertical blanking signal of a conventional television signal requires that the many fragments of program information be assembled over time in the viewer's decoder equipment. As a consequence, this system is limited to providing only brief text descriptions of programs and improves only slightly upon conventional program listings. Moreover, the supplemental text descriptions provided by this system obscure much of the program schedule information and therefore requires that the viewer switch between viewing the program schedule information and the supplemental text descriptions.

Conventional cable television program guide services provide only the title or brief test descriptions of the scheduled programming. Such extremely limited information typically requires supplementation by a printed video guide for a viewer to obtain meaningful program schedule information. In view of the expected shortcomings of printed schedule guides for IT systems and the limited information provided by conventional cable television program guides, IT systems will require improved methods of providing program information to viewers.

SUMMARY OF THE INVENTION

The present invention includes a method of displaying for a viewer summary information relating to programming available on an interactive television or televideo system. The IT system includes a central control node that delivers programming to multiple subscribers or viewers. Each viewer has a video display set (e.g., a television receiver) and an associated interactive controller that is responsive to input from the viewer for controlling programming on the video display set.

With reference to a preferred embodiment, the method of this invention includes obtaining a viewer selection indication corresponding to a program selected by the viewer from a programming guide. Based on the viewer selection indication, the IT system accesses summary information relating specifically to the program selected by the viewer. The summary information preferably includes a text description of the programming and display imagery relating to the programming. The display imagery may include a still video image or a multi-frame video sequence of or relating to the programming, together with an associated audio segment. The display imagery could also include the programming as it is being broadcast.

The text description and the display imagery are rendered on the display screen of the viewer's television receiver in a program summary panel that is positioned adjacent the programming guide from which the user selected the programming. The program summary panel includes a video preview window and a separate text window within which the respective display imagery and text description are rendered. The text window may also include one or more icons indicating that the program has selected characteristics. The associated audio segment preferably relates to the selected programming.

The present invention provides detailed information about scheduled programming for an arbitrary number of programming channels. No printed scheduling information is required. The availability of multi-frame video previews or direct broadcast transmissions provides programming information that viewers have not previously been able to obtain for selected programming.

The foregoing and other features and advantages of preferred embodiments of the present invention will be more readily apparent from the following detailed description, which proceeds with reference to the accompanying drawings.

BRIEF DESCRIPTION OF THE DRAWINGS

FIGS. 3A and 3B are respective block and stylized diagrams of a video display screen with a programming guide and a program summary panel of the present invention for summarizing selected programming.

FIG. 4 is a plan diagram of a viewer control unit for providing viewer input to the interactive station controller of FIG. 2.

FIG. 5 is a flow diagram of an interactive method of summarizing selected programming according to the present invention.

DETAILED DESCRIPTION OF PREFERRED EMBODIMENTS

Figure 1:
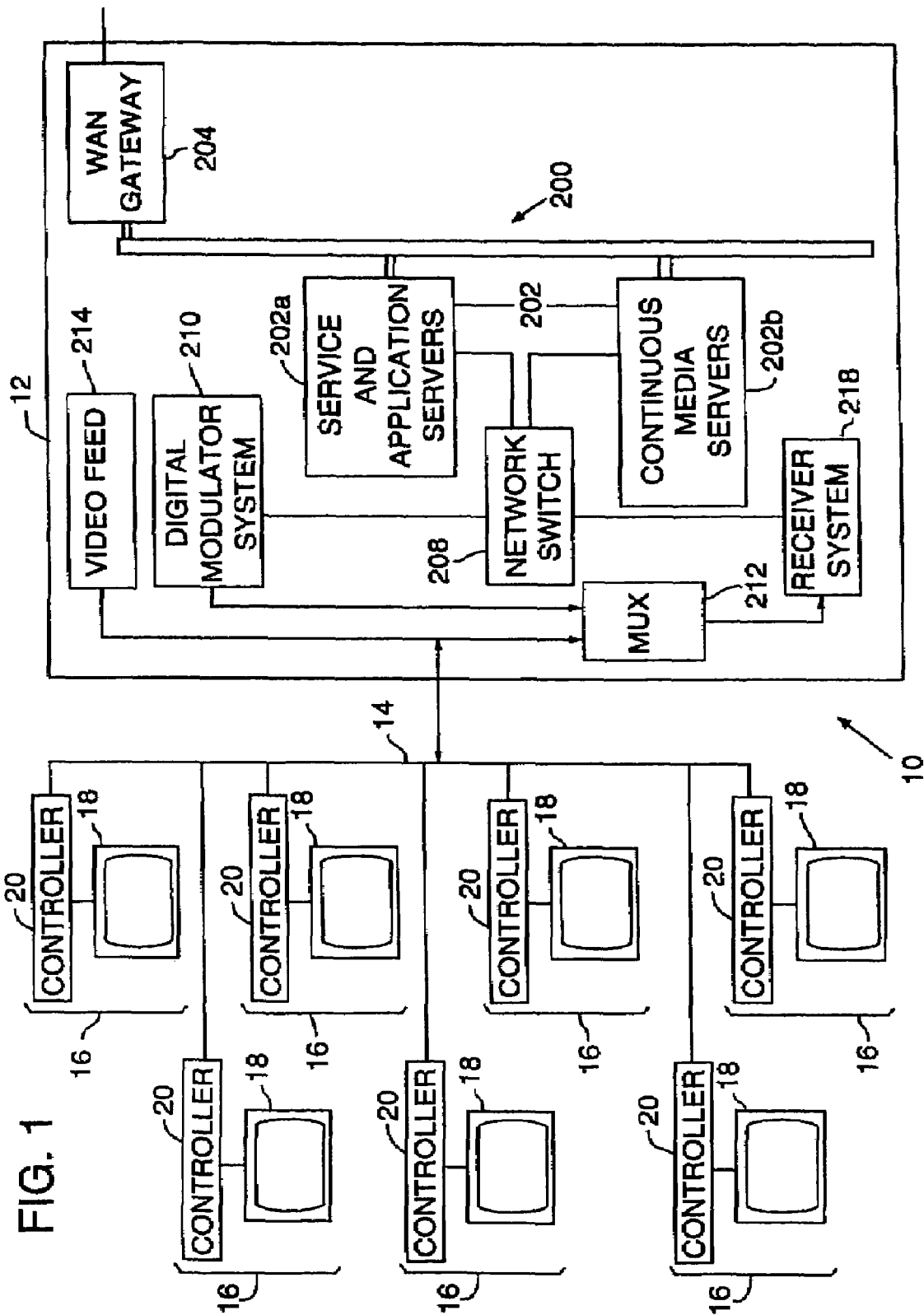
FIG. 1 is a block diagram of an interactive television system used for the preferred embodiment of this invention.
Figure 2:
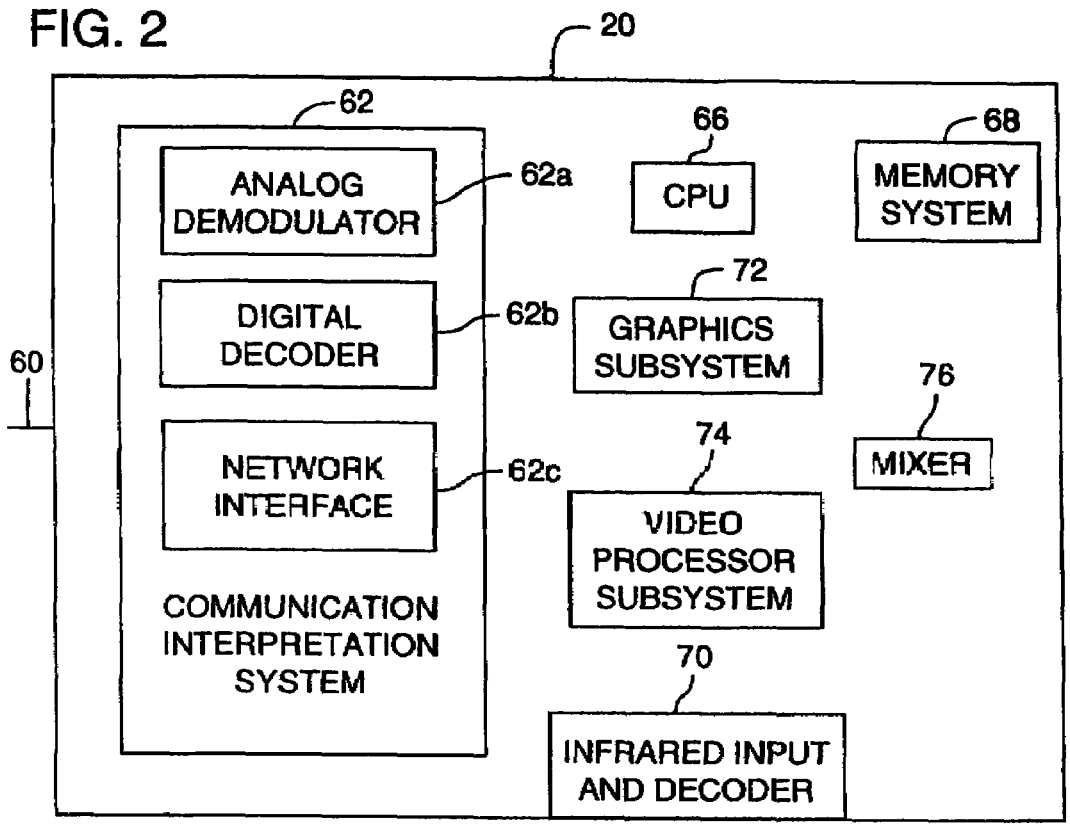
FIG. 2 is a block diagram of an interactive station controller used for the preferred embodiment of this invention.

FIGS. 1 and 2 are directed to an interactive television or televideo (IT) system 10 as an operating environment for preferred embodiments of the present invention. For purposes of simplicity and clarity, IT system 10 is described with reference to widely available systems and standards, including conventional analog television receivers and cable-based video networks.

It will be appreciated, however, that the particular components of IT system 10 may be implemented with a variety of conventions, standards, or technologies without departing from the underlying concepts of the present invention. The term televideo is used to emphasize the applicability of this invention beyond standard television-based systems. As two examples, the conventional analog television receivers and cable-based video network referred to in FIGS. 1 and 2 could be implemented as digital video receivers and a satellite downlink transmission system, respectively.

FIG. 1 is a simplified block diagram of an interactive televideo (IT) system 10 having a central control node 12 that transmits programming over a network 14 to multiple viewer stations (e.g., homes) 16. The programming may include standard analog video broadcasts (e.g., NTSC, PAL or SECAM), digital or digitally encoded video broadcasts (e.g., MPEG1 or MPEG2), or digital information related to computer-executed applications.

Each viewer station 16 includes at least one video display set 18 (e.g., a television receiver) and an interactive station controller 20, which is sometimes referred to as a set-top box. Although it is shown distinct from video display set 18, interactive station controller 20 could alternatively be integral with video display set 18.

Interactive station controllers 20 receive programming from central control node 12 and control the associated video display sets 18 in accordance with the programming. Controlling video display set 18 of a conventional analog type may include, for example, delivering an analog video signal directly to video display set 18 for display, converting a digital video signal to a suitable analog form for display, or executing a computer application that includes displays on display set 18.

Interactive station controllers 20 transmit digital information to and receive digital information from central control node 12. The digital information typically relates to applications executed by processors residing at control node 12 and station controller 20, as described below in greater detail.

Preferably, network 14 carries bidirectional communication between station controllers 20 and central control node 12. Alternatively, communication between station controllers 20 and central control node 12 can be carried by different communication systems. For example, programming from central control node 12 to station controllers 20 could be carried on a satellite downlink while station controllers 20 send information to central control node 12 on a terrestrial modem link. An exemplary embodiment of central control node 12 is described in greater detail below.

FIG. 2 is a simplified block diagram of an exemplary one of interactive station controllers 20 for controlling video display set 18 and communicating with central control node 12. Station controller 20 includes an input 60 that delivers communication or information from central control node 12 to a communication interpretation system 62 having, for example, an analog television demodulator 62a, a digital video decoder 62b, and a digital network communication interface 62c.

Demodulator 62a functions as a conventional television tuner for selecting one of multiple conventional analog video signals received from central control node 12 at input 60. Video decoder 62b functions as a digital equivalent of demodulator 62a for selecting one of multiple digital video signals received at input 60 from central control node 12. Network communication interface 62c communicates with central control node 12 with digital information carried over baseband frequencies. The baseband frequencies may be below the conventional analog video signal frequencies, above the digital video signal frequencies, or between the frequencies of analog or digital video signals.

A central processing unit (CPU) 66 in conjunction with a memory system 68 controls operation of station controller 20. CPU 66 is responsive to an infrared receiver and decoder system 70 that receives user input from a hand-held viewer control unit 71 (FIG. 4) and delivers the input to CPU 66. For example, CPU 66 controls selection of analog- or digital-based programming or applications delivered from central control node 12, accesses, activates, or executes selected applications, or delivers information to or requests information from central control node 12.

A graphics subsystem 72 is controlled by CPU 66 to form graphics images, video processor subsystem 74, also controlled by CPU 66, provides control in the rendering of video imagery, including decompressing digital video signals and sizing and positioning a video display window. A mixer 76 receives a video display signal from video processor subsystem 74 and graphics image signals from graphics subsystem 70 and delivers a mixed image signal to video display set 18. Mixer 76 provides compositing, masking and blending of display signals from two or more image sources such as, for example, a digital video signal and locally-generated graphics or an analog video signal and a bitmap image received from central control node 12.

Figure 3B:
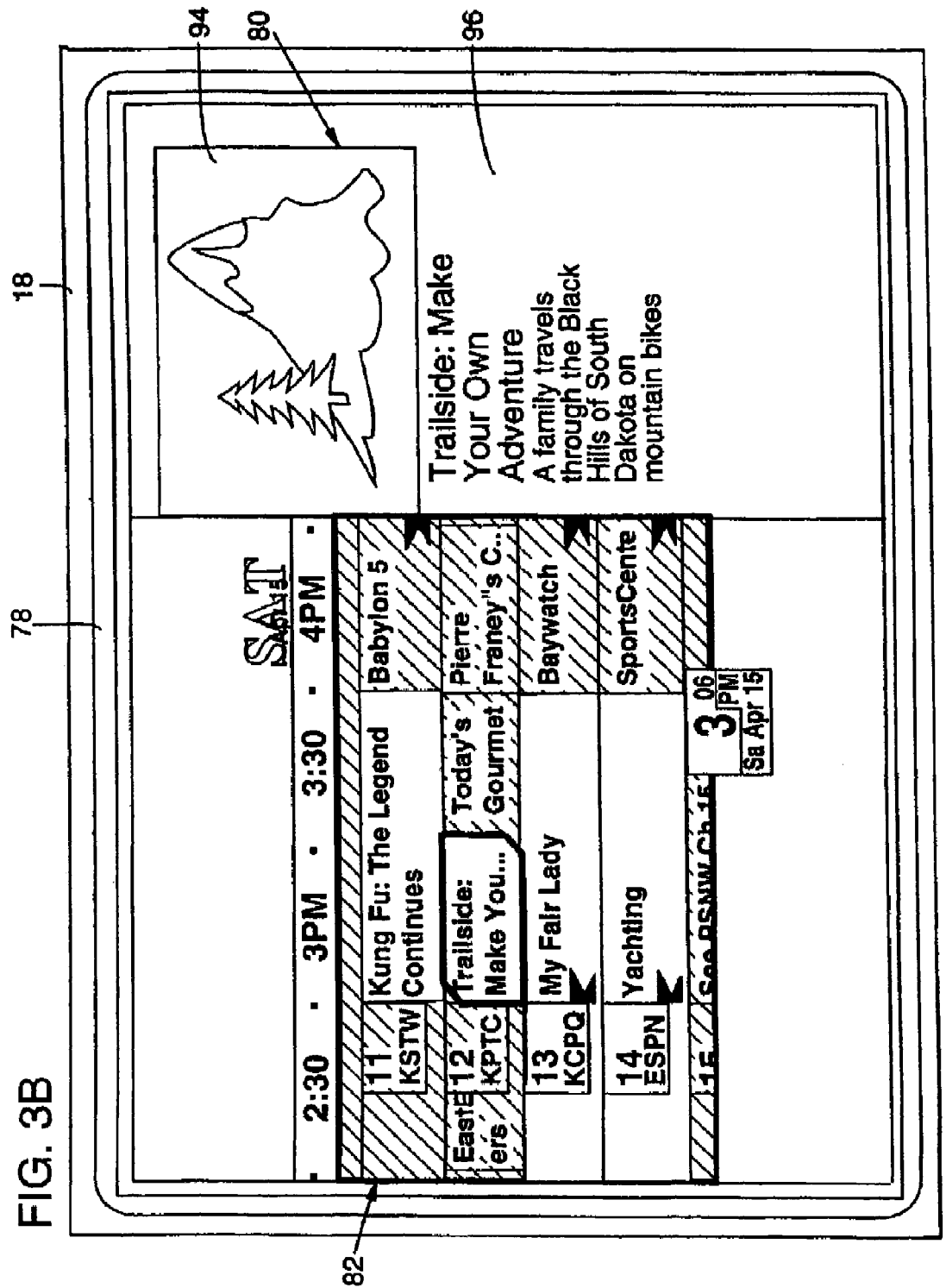

FIGS. 3A and 3B show a display screen 78 of one of video display sets 18 with a program summary panel 80 of the present invention rendered thereon. Program summary panel 80 preferably is displayed in conjunction with a programming guide 82 that displays programming available for a particular date over a selected time range. Programming guide 82 includes a channel panel 84 identifying multiple particular channels or services (e.g., four channels or services), a time panel 86 listing particular times (e.g., a two hour time period in 30 minute increments), and a program grid 87 of program tiles 88 listing titles of programming on the identified channels at the listed times.

Referring to FIG. 4, viewer control unit 71 includes an infrared transmitter window 89 through which control unit 71 emits infrared signals to infrared input 70 of station controller 20. A directional control keypad 90 allows a viewer to transmit signals for moving a cursor (i.e., an indication of position) between tiles 88 on programming grid 86.

The cursor may be rendered on display screen 78 as a graphic character or icon or by changing the graphic characteristics of the program tile 88 where the cursor is positioned. The programming identified in a program tile 88 to which a viewer moves the cursor indication is referred to as being focused upon by the viewer or as focussed programming. The viewer may initiate or activate selections by depressing an action key 91 and may enter numeric values with numeric key pad 92.

Interactive station controller 20 generates a program summary panel 80 of the present invention for the programming focused upon by a viewer. Program summary panel 80 includes a preview display window 94 within which interactive station controller 20 renders display imagery relating the focussed programming. The display imagery may include currently available video programming, an on-demand video clip or segment, or a still image, as described below in greater detail.

A text description window 96 displays a program title (preferably of a distinct font), a text description of the program, and one or more information icons relating to selected characteristics of the programming. Preferably, station controller 20 also provides an audio segment related to the selected programming.

FIG. 5 is a flow diagram showing an interactive method of displaying a summary of programming available on IT system 10.

Process block 100 indicates that program schedule information for a predetermined period is retrieved by interactive station controller 20 from an electronic programming guide (EPG) database 102 in central control node 12. The program schedule information includes, for example, program titles, broadcast times, and assigned channels, for a period of, for example, twenty-four hours. Interactive station controller 20 stores the program schedule information in memory system 68. Interactive station controller 20 preferably retrieves the program schedule information upon startup and at periodic intervals after startup. Process block 104 indicates that interactive station controller 20 displays a programming guide 82 on video display set 18. Preferably, central processing unit 66 cooperates with graphics subsystem 72 and the program schedule information stored in memory system 68 to render a graphic programming guide 82 of the type shown in FIG. 3.

Process block 108 indicates that a viewer selects or focuses upon a program tile 88 in programming guide 82 as described above, for example.

Process block 110 indicates that interactive station controller 20 accesses summary information about the programming focused upon by the viewer.

Process block 114 indicates that a summary text description of the selected programming and pointers to icons summarizing any selected information about the programming is retrieved from a memory included in IT system 10. Preferably, station controller 20 periodically (e.g., daily or weekly) receives from EPG database 102 summary text descriptions and related icon bitmaps for a predetermined time period and stores them in memory system 68. Station controller 20 retrieves from memory system 68 summary text descriptions and related bitmaps of any icons pointed to and displays the icons and summary text description for the viewer.

Alternatively, station controller 20 can retrieve from EPG database 102 the summary text descriptions and related bitmaps of icons that are not available in local memory 68 for the program tile 88 selected or focused upon by the viewer. Circumstances in which the summary text descriptions and related bitmaps of icons would not be available in local memory 68 include, for example, the viewer selecting a program tile 88 outside the predetermined time period for which the information is stored in memory 68, a video, graphic, or audio segment being associated with the information, or the information in memory 68 requiring an update or correction.

Decision block 116 represents an inquiry as to whether the selected programming is currently being broadcast and available to the user. Availability of the selected programming relates, for example, to whether the viewer is a subscriber to the selected programming. Decision block 116 proceeds to process block 118 whenever the selected program is currently being broadcast and available to the user and otherwise proceeds to process block 122.

Process block 118 indicates that communication system 62 tunes to the selected programming and displays it on video display set 18 within preview display window 94 of program summary panel 80. Video processor subsystem 74 functions to size and position the selected programming within preview display window 94.

Process block 122 indicates that central control node 12 retrieves preview media information from EPG database 102 or, alternatively, from memory 68 of station controller 20. The preview media information indicates whether the preview or display imagery available for the selected programming includes a video clip or segment of or relating to the selected program or a still image of or relating to the selected programming.

Decision block 128 represents an inquiry as to whether a digitized preview video clip or segment is available for the selected programming. Decision block 128 proceeds to process block 130 whenever a digitized video clip or segment is available and otherwise proceeds to process block 132.

Process block 130 indicates that the digitized video clip or segment is cued from an electronic programming guide (EPG) preview server computer at central control node 12 and transmitted to interactive station controller 20 for display to the viewer.

Preferably, the digitized video segment relates to the specific episode of the selected programming. If an episode-specific segment is not available, the digitized video segment preferably relates to any program series of which the selected programming episode is a part. If a series-specific segment is not available, the digitized video segment preferably relates to the channel carrying or broadcasting the selected programming.

Process block 132 indicates that a digitized still image is retrieved from EPG database 102 and transmitted to interactive station controller 20 for display to the viewer. Preferably, the still image relates to the specific episode of the selected programming. If an episode-specific still image is not available, the digitized still image preferably relates to any program series of which the selected programming episode is a part. If a series-specific still image is not available, the digitized still image preferably relates to the channel carrying or broadcasting the selected programming.

Decision block 134 represents an inquiry as to whether the viewer has selected or focused on a different program tile 88. Decision block 134 returns to process block 110 if the viewer has selected or focused an a different program tile 88 and otherwise proceeds to end block 136.

A digitized audio segment may be retrieved from EPG database 102 for playing with each digital video segment or still image. The audio segment may include one or more of a voice announcement, an audio portion of the selected programming, or music. The accessing and retrieval of audio segments would be substantially the same as the accessing and retrieval of still images or digitized video segments.

Preferably, the audio segment relates to the specific episode of the selected programming. If an episode-specific segment is not available, the digitized audio segment preferably relates to any program series of which the selected programming episode is a part. If a series-specific segment is not available, the digitized audio segment preferably relates to the channel carrying or broadcasting the selected programming.

The method described above is directed to an IT system 10 in which selected information is stored at and retrieved from EPG database 102 or EPG preview server 131 at central control node 12. The benefits of the present invention could also be achieved in IT systems having some or all of the selected information stored at and retrieved from interactive station controllers.

The availability of text description, information icons, and display imagery for use in program summary panel 80 is based upon an electronic programming guide (EPG) database managed within central control node 12, as described below in greater detail. The EPG database preferably includes the following tables:

i) an episode table containing records for each interactive or broadcast televideo episode;

ii) a series table containing records for each interactive or broadcast series;

iii) a still image table comprising bitmaps or vector graphic definitions of still-image previews or pointers to computer files containing such still-image previews;

iv) an audio table containing digitized audio digital wave synthesis definitions or MIDI (Musical Instrument Digital Interface) note and timing definitions of music and voice-over previews or pointers to computer files containing such audio previews;

v) an audio/video table containing digitized video and audio, either in MPEG, AVI, Quicktime or other digital video format for full-motion video and audio storage, or pointers to computer files containing such video previews;

vi) a tuning information table containing broadcast, cablecast or satellite transmission tuning information for channel lineups available to viewers, including network and affiliation information; and vii) a programming characteristic table containing broadcast properties or characteristics such as closed captioning and viewer discretion advised, which include pointers to image definitions of associated descriptive icons.

Within the EPG database, each programming event or episode record is linked to a parent series record. One-time programming events or specials have a single episode record linked to a single series record. Each episode record can have pointers to episode preview or display imagery in still image, audio, or multi-frame digital video format. Each episode may also be linked to selected broadcast properties that identify selected characteristics of the episode.

Similarly, each series record may have pointers to previews or display imagery relating to the series in still image, audio, or multi-frame digital video format, or selected broadcast properties that identify selected characteristics of the series. Also, each channel record may have pointers to previews or display imagery relating to the channel in still image, audio, or multi-frame digital video format, or selected broadcast properties that identify selected characteristics of the channel. The term channel refers to a provider of programming and can include, for example, a broadcast network or an application provider.

Retrieval of text description, information icons, and preview display imagery entails correlating the programming selected or focused upon by the viewer with the corresponding episode record. Any pointers in the record to program summary information are tracked and the information is retrieved. If no pointers to program summary information are associated with the episode, the programming selected by the viewer is correlated with the corresponding series record in the series table. Any pointers to series-specific program summary information are tracked and the information is retrieved.

If the series record contains no pointers to program summary information, a default still image or graphic retrieved for rendering within preview window 94. The default still image may be a channel-specific image or graphic for the channel carrying or transmitting the selected programming or a predetermined IT system or EPG image or graphic.

Table 1 below lists the preferred display imagery rendered in preview display window 94 of program summary panel 92 for different types of programming on IT system 10. The display imagery in preview display window 94 preferably is the currently broadcasting programming for focused programming available to the viewer. Programming available to the viewer includes the programming to which the viewer subscribes, including premium programming services.

TABLE 1

| Type of Service/<br>Channel Selected | Broadcast<br>Preview | Continuous<br>Media Server<br>Preview | Still<br>Preview |
|---|---|---|---|
| Audio on demand | NO | If bandwidth available | YES |
| Current or future PPV broadcast | If limited in some way (for example timed preview, disabled audio or alternate audio track) | If bandwidth available | Likely |
| Current broadcast (not PPV) | Always | NO | NO |

TABLE 1-continued

| Type of Service/ Channel Selected | Broadcast Preview | Continuous Media Server Preview | Still Preview |
|---|---|---|---|
| Electronic Program Guide | NO | NO | YES |
| Future broadcast (not PPV) | NO | First choice if bandwidth available | Second choice |
| Interactive service | NO | First choice if bandwidth available | Second choice |
| Past broadcast (PPV/Continuous Media Server archive) | NO | First choice if bandwidth available | Second choice |
| NVOD service | First choice—asynchronous loop | NO | Second choice—still carousel |
| VOD service | NO | First choice if bandwidth available | Second choice |

Rendering the selected programming in preview display window 94 could also be used in connection with current or future pay-per-view (PPV) broadcasts, if the preview were limited until the viewer elects or subscribes to the broadcast. An asynchronous loop of broadcast previews could be rendered in preview display window 94 for near-video-on-demand (NVOD) services.

An asynchronous loop of broadcast previews could include non-specific video segments or trailers, or service advertisements, delivered simultaneously to all viewers and thus requiring no media server load or dedicated media server channels. A broadcast preview could be implemented for each of the other listed services with an asynchronous loop of broadcast previews carried on a dedicated channel.

Video clips or segments of multiple frames would preferably be rendered in preview display window 94 for future non-PPV broadcasts, interactive services such as news-on-demand or an interactive game service, past broadcast services, video-on-demand (VOD) services, and if, bandwidth is available on network 14, audio-on-demand and current or future PPV broadcasts. In connection with all types of service, still images could be rendered in preview display window 92 as a system backup or due to limited system capability.

Figure 6:
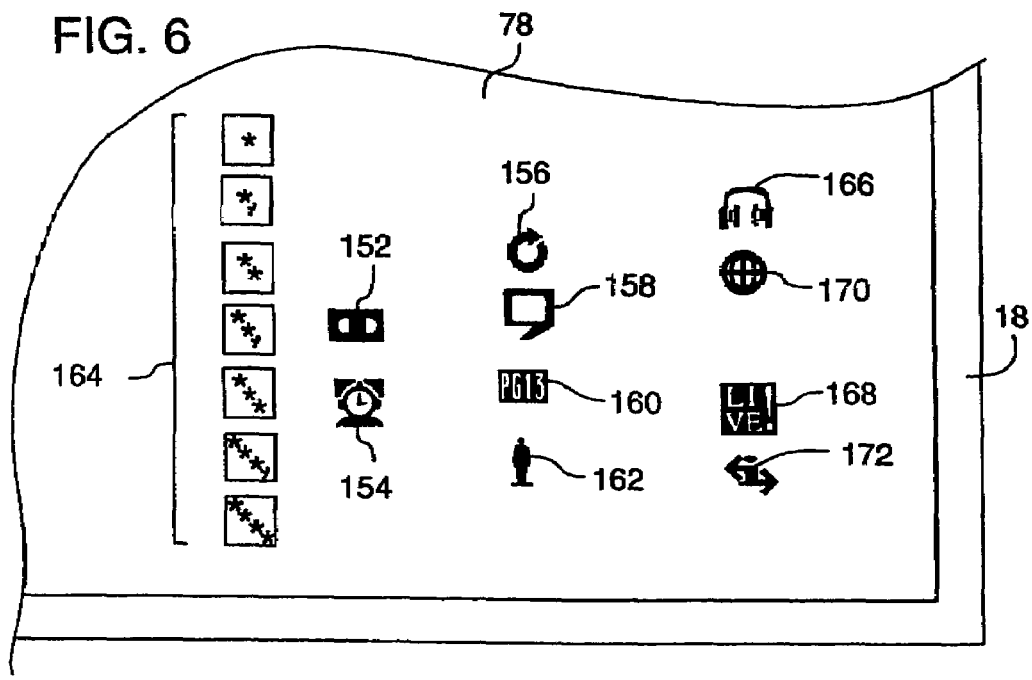
FIG. 6 is a diagram of a portion of a video display screen with exemplary icons for use in the program summary panel of FIG. 3.

FIG. 6 is a front view of a display screen 78 of an exemplary video display set 18 showing icons 150 that are selectively rendered individually or together within the text description window 94 of program summary panel 90. It will be appreciated that icons 150 are exemplary and that different icons representing the same or different information may be used in accordance with the present invention.

A VCR record icon 152 indicates that the selected program has been cued by the viewer for future recording by a video cassette recorder (VCR) at the viewer's station 16. A reminder icon 154 indicates that the selected program has been cued by the viewer for generating a reminder briefly before the start of the program. A re-run icon 156 indicates that the selected program is a re-run (i.e., a re-broadcast) of a first-run program series.

Closed captioning icon 158 indicates that the selected programming includes closed captioning text for hearing-impaired viewers. Audience rating icon 160 (as shown as an exemplary PG-13 rating) represents an audience rating applied to a motion picture by the Motion Picture Advisory Association, or other indications such as "viewer discretion advised". Awards icon 162 indicates that the selected programming is an award program such as, for example, the motion picture Academy Awards. Star rating icons 164 represent critical ratings as applied, typically, to motion pictures.

Stereo icon 166 identifies the selected programming as including a stereo audio component. Live icon 168 indicates that the selected program is a live broadcast. Premium icon 170 indicates that the selected programming is a part of a premium or surcharge service available over network 14. Interactive icon 172 identifies the selected programming as an interactive show or service. In addition to icons 150, it will be appreciated that other icons could be used to identify selections of interactive system services, specialized audio capabilities (e.g., Dolby® or THX®), or customized program-specific icons identifying, for example, college or professional sports.

Preferably, icons 150 are stored at central control node 12 as bitmap files and downloaded to interactive station controller 20 in response to pointers or other indicators associated with the text summary description information. Icons 150 are generated within text description window 94 in cooperation with graphics subsystem 72 of station controller 20.

Referring to FIG. 1 central control node 12 includes a digital local area network (LAN) 200 with multiple computer servers 202 for performing various interactive system applications or functions. Servers 202 include, for example, multiple state-of-the art microprocessors that operate in parallel and access or control data storage devices with large data capacities. A digital communication gateway 204 couples LAN 200 to a wide area network (WAN) (not shown) for obtaining and delivering IT system information.

Servers 202 may include, for example, service and application servers 202a and continuous media servers 202b. Service and application servers 202a process interactive service requests from subscribers and provide services and applications associated with operation of IT system 10. Service and application servers 202a may be dedicated to particular applications such as an electronic programming guide for viewers, network security, monitoring, object storage, financial transactions, data access, and other administration functions.

Continuous media servers 202b provide storage and on-demand or near on-demand delivery of digitized video information. The digitized video information can include video programming of substantially any duration ranging from individual image frames and brief video clips to full-length motion pictures.

Servers 202 communicate with station controllers 12 via a network communication switch 208, such as an asynchronous transfer node (ATM) switch. For communication from servers 202 to station controllers 20, network communication switch 208 arranges digital information received from servers 202 in a standard bidirectional digital communication format for transmission over network 14. For communication from station controllers 12 to servers 202, network communication switch 208 converts digital information from the standard bidirectional digital communication format for delivery to servers 202.

Digital information from servers 202 is frequency modulated by a digital modulator system 210 for transmission over network 14. Digital information that includes video programming is preferably modulated at frequencies greater than the standard analog television frequency range, which is 50-450 MHz under the NTSC television standard. Digital information that does not include video programming may be modulated at baseband frequencies that are less than the standard analog television frequency range.

A multiplexing system 212 receives and mixes the frequency modulated digital information from modulator system 210 and standard analog video signals obtained from a standard analog video feed 214 and delivers an IT composite signal to interactive network 14. Analog video feed may be or include a satellite downlink, a cable receiver, or any locally generated programming. A reverse channel receiver system 218 receives and demodulates digital communications from station controller 20 for processing by servers 202.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. In an interactive televideo system having a central control node in bidirectional communication with plural viewer stations that include video display sets operably coupled to interactive station controllers, the central control node delivering video programming over multiple channels to the plural viewer stations and receiving information from the interactive station controllers, the system including a programming guide from which viewers select programming, a method of displaying summary information chosen from one or more kinds of summary information ranging in relatedness to the selected programming with a preference for displaying the most closely related kind of summary information available, comprising:

providing programming information from the central control node to an interactive station controller, the programming information including at least an identity for each of a plurality of available programs;

providing summary information from the central control node to an interactive station controller, wherein the summary information is associated with at least one of the available programs and comprises display imagery including one or more of a still image, a plurality of images, a video segment of less than the entire program, or the current broadcast of the program;

storing the programming information at the interactive station controller;

storing the summary information at the interactive station controller;

accessing the programming information and displaying the programming information in the programming guide on the video display;

obtaining a user selection indication corresponding to programming selected by the viewer from the programming guide;

accessing in response to the user selection indication the summary information relating to the programming selected by the viewer; and displaying the most closely related kind of summary information available for the selected programming; and wherein the most closely related kind of summary information includes at least a text description and imagery relating to the programming selected by the user, wherein the imagery includes a still picture of programming selected by the user, a video sequence of the programming selected by the user, or video content in broadcast stream of the programming selected by the user as it is being broadcast; the video content of the broadcast stream being broadcast, the video sequence, or the still picture of programming selected by the user is automatically retrieved and displayed according to a priority order, wherein the still picture is automatically retrieved and displayed when both programming selected by the user is not being broadcast and the video sequence of programming selected by the user are not available.

2. The method of claim 1 in which the displaying of the summary information includes displaying the text description in a text description window.

3. The method of claim 1 in which the displaying of the summary information includes displaying the display imagery in a preview display window.

4. The method of claim 1 in which the selected programming is transmitted from the central control node when the programming is selected by the viewer and the video segment includes the transmitted selected programming.

5. The method of claim 1 in which the summary information is displayed simultaneously with the programming guide.

6. The method of claim 1 in which the summary information displayed for the viewer includes an icon indicating a predetermined characteristic of the selected programming.

7. The method of claim 6 in which the predetermined characteristic of the selected programming is selectively cued by the viewer.

8. In an interactive video system having a central control node in bidirectional communication with plural viewer stations that include video display sets operably coupled to interactive station controllers, the central control node delivering video programming over multiple channels to the plural viewer stations and receiving information from the interactive station controllers, the system including a programming guide from which viewers select programming, a method of displaying summary information chosen from one or more kinds of summary information ranging in relatedness to the selected programming with a preference for displaying the most closely related kind of summary information available, comprising:

obtaining from the central control node programming summary information that relates to programming available to a viewer, the programming summary information including at least a plurality of images, each image being related to at least one of the available programming;

storing the programming summary information in a memory associated with the interactive station controller system;

obtaining an indication of programming selected by the viewer from the programming guide;

retrieving from the memory the programming summary information corresponding to the programming selected by the viewer from the programming guide in response to the obtained indication, wherein the retrieved programming summary information is the most closely related kind of summary information available for the selected programming; wherein the most closely related kind of summary information includes at least a text description and imagery relating to the programming selected by the user, wherein the imagery includes a still picture of programming selected by the user, a video sequence of the programming selected by the user, or video content in broadcast stream of the programming selected by the user as it is being broadcast; the video content of the broadcast stream being broadcast, the video sequence, or the still picture of programming selected by the user is automatically retrieved and displayed according to a priority order, wherein the still picture is automatically retrieved and displayed when both programming selected by the user is not being broadcast and the video sequence of programming selected by the user are not available; and displaying the retrieved programming summary information for the viewer on a video display set.

9. The method of claim 8 in which the text description is displayed in a text window and the video segments are displayed in a preview display window adjacent the text window.

10. The method of claim 8 in which the programming summary information is displayed simultaneously with the programming guide.

11. The method of claim 8 in which the programming summary information displayed for the viewer includes an icon indicating a predetermined characteristic of the selected programming.

12. The method of claim 11 in which the predetermined characteristic of the selected programming is selectively cued by the viewer.

13. In an interactive video system having a central control node in bidirectional communication with plural viewer stations that include video display sets operably coupled to interactive station controllers, the central control node delivering video programming over multiple channels to the plural viewer stations and receiving information from the interactive station controllers, the system including a programming guide listing programming available to a viewer, a method of displaying summary information at an individual user station chosen from one or more kinds of summary information ranging in relatedness to the selected programming with a preference for displaying the most closely related kind of summary information available, comprising:

providing from the central control node to the plurality of viewer stations programming information, the programming information including an identification of a plurality of programs currently available from the central control node and an identification of a plurality of future programs that will be available from the central control node at a future time;

storing the programming information at the plurality of viewer stations;

providing from the central control node to the plurality of viewer stations summary information, wherein the summary information is associated with at least one of the available programs and display imagery including one or more of a still image, a plurality of images, a video segment of less than the entire program, or the current broadcast of the program;

storing the summary information at the plurality of viewer stations;

accessing and displaying the programming information at an individual user station in response to a request from a viewer of the individual user station to display the program guide;

obtaining a user selection at the individual user station, the user selection indicating a currently selected program within the program guide;

in response to a user selection of a currently available program, displaying at the individual user station the currently available program simultaneously with the program guide; and in response to a user selection of one of the at least one of the future programs, accessing and displaying at the individual user station the most closely related kind of summary information available for the selected programming simultaneously with the program guide; and wherein the most closely related kind of summary information includes at least a text description and imagery relating to the programming selected by the user, wherein the imagery includes a still picture of programming selected by the user, a video sequence of the programming selected by the user, or video content in broadcast stream of the programming selected by the user as it is being broadcast; the video content of the broadcast stream being broadcast, the video sequence, or the still picture of programming selected by the user is automatically retrieved and displayed according to a priority order, wherein the still picture is automatically retrieved and displayed when both programming selected by the user is not being broadcast and the video sequence of programming selected by the user are not available.

14. The method of claim 13 in which the summary information includes a text description relating to the programming available to the viewer and the text description is displayed simultaneously with the selected program and the programming guide in response to a user selection of a currently available program.

15. The method of claim 13 in which the summary information is displayed simultaneously with the programming guide.

16. The method of claim 13 in which the summary information displayed for the viewer includes an icon indicating a predetermined characteristic of the selected programming.

17. The method of claim 16 in which the predetermined characteristic of the selected programming is selectively cued by the viewer.

* * * * *